Feb. 8, 1966  A. O. BECKMAN  3,234,540
METER POINTER POSITION MONITORING MEANS UTILIZING
HEAT ABSORBING VANE AND THERMISTORS
Filed Dec. 6, 1963  2 Sheets-Sheet 1
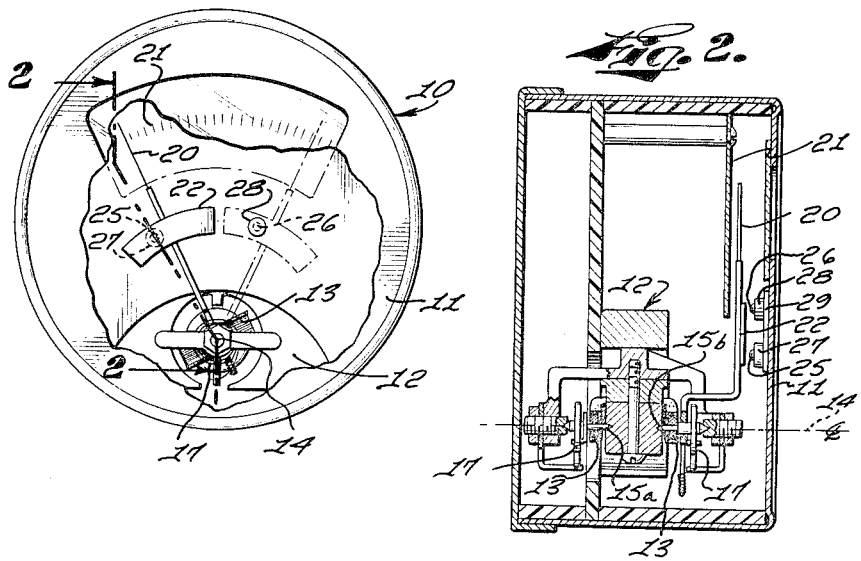
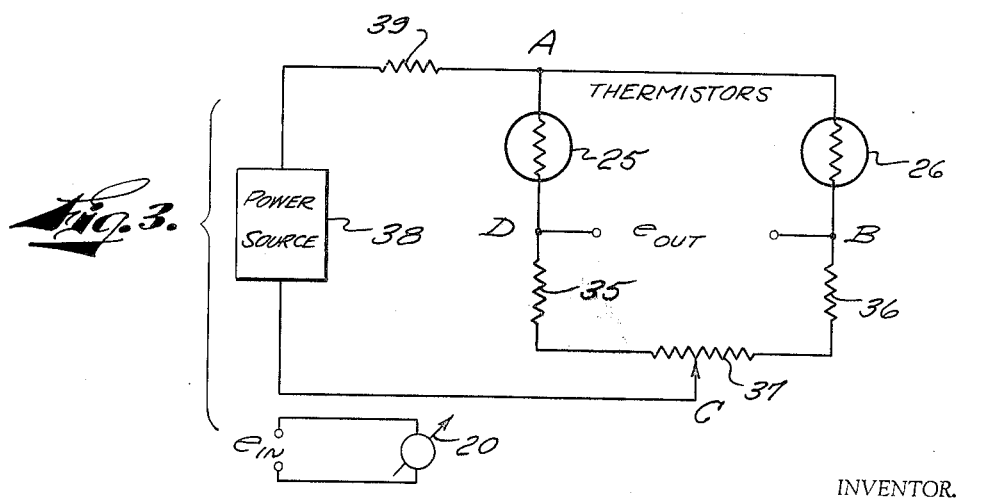
INVENTOR.
ARNOLD O. BECKMAN
BY FOWLER, KNOBBE
& GAMBRELL
ATTORNEYS

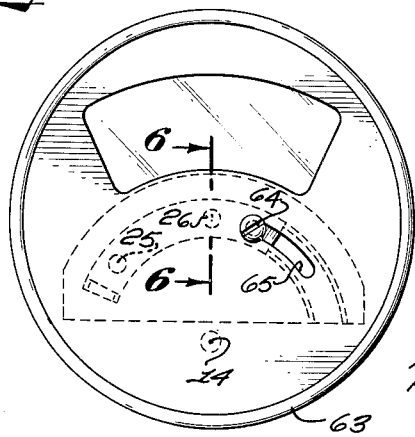
Fig. 5.
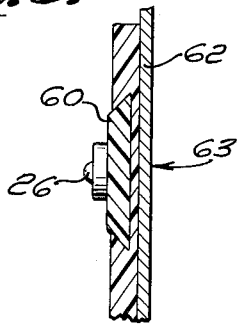
Fig. 6.
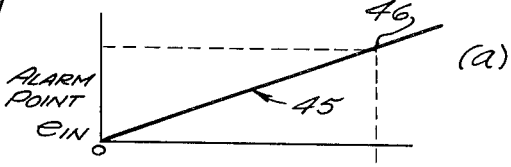
Fig. 4.
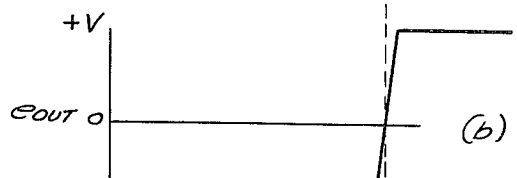
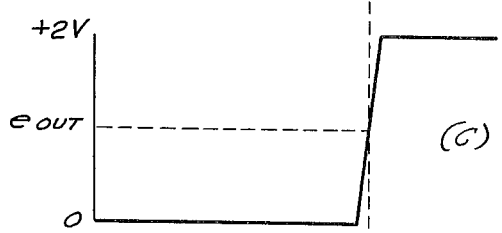
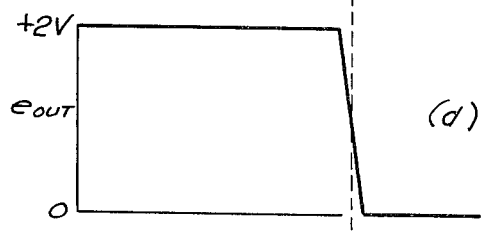
INVENTOR.
ARNOLD O. BECKMAN
BY FOWLER, KNOBBE
& GAMBRELL
ATTORNEYS United States Patent Office 3,234,540
Patented Feb. 8, 1966

3,234,540
METER POINTER POSITION MONITORING MEANS UTILIZING HEAT ABSORBING VANE AND THERMISTORS
Arnold O. Beckman, Corona Del Mar, Calif., assignor to Beckman Instruments, Inc., a corporation of California
Filed Dec. 6, 1963, Ser. No. 328,724
5 Claims. (Cl. 340—266)

The present invention relates to an improved transducer and, more particularly, to a transducer comprising an electrical meter incorporating means for sensing predetermined meter readings.

Instruments for sensing and measuring current and potential difference are well known in the art. Representative examples of these electrical meters are the ammeter and voltmeter utilizing D'Arsonval galvanometer movements. This form of galvanometer normally includes a coil mounted by a resilient suspension within a radial magnetic field. A pointer connected to and rotating with the coil moves along a calibrated scale. By Ampere's law, a torque is applied to the coil when a current flows therethrough, the amount of rotation that the coil and pointer undergo being proportional to the input current. These meters have been the subject of substantial design effort in the past and, as a result, electrical meters are commercially available that have excellent operating accuracies.

The high sensitivities and accuracies of the D'Arsonval instruments make it desirable to utilize their designs in applications providing something other than visual readout. For example, it is often desirable to produce an on-off type electrical signal when the meter reads one or more predetermined values. Such a device, for example, may be used for providing an alarm function whenever the meter reading is above or below a predetermined value. Because high sensitivity meter movements are low mass and low inertia devices, however, the very minute torques generated preclude the actuation of on-off electrical contacts capable of passing a large current such as that ordinarily required to operate an alarm light or audible horn. Moreover, the friction necessarily applied to the meter movement for obtaining contact closure would result in a substantial reduction of the meter accuracy.

One approach to the problem widely employed in the prior art has been to attach a very light contact to the pointer, which closes against a contact attached to a movable arm. The movable arm provides a convenient method of setting the alarm point when it is formed with a pointer. Such light contacts have been used to operate a relay with heavier contacts, capable of operating an alarm device. A further refinement has been to equip the meter movement with a second current coil which is connected in series with the sensitive contacts, the power relay, and a D.C. power supply. The second coil is commonly called the "holding coil," since it may exert a much greater torque on the movement firmly clamping the sensitive contacts. It is then necessary to interrupt the holding circuit before the contacts will open, in spite of any change in the current in the sensing coil. The largest disadvantage of this approach is that the indicator does not function beyond the preset alarm point, the pointer travel being limited by the contact closure.

Another approach to obtaining an electrical meter having an on-off output without adversely affecting the accuracy of the instrument is described in U.S. Patent No. 3,010,026, issued to Richard P. Schake. An opaque member attached to the meter pointer is adapted to interrupt the passage of light between a lamp and a photosensitive resistor. This system offers several advantages over make-break electrical contacts since no force is required to interrupt the light path but the indicator functions beyond the set point since there is no mechanical restriction of its travel. Additional problems are introduced by such a design approach. Thus, incandescent lamps require fairly substantial power inputs and operate at relatively high temperatures. Moreover, since these lamps are subject to burnout, the instruments must be so designed that the lamps may be replaced from time to time. Furthermore, incandescent lamps are relatively fragile devices.

The principal object of the present invention is to provide an improved transducer which requires very low values of input power, which is relatively inexpensive to manufacture, and which requires little if any maintenance.

Other and further objects, features and advantages of the invention will become apparent as the description proceeds.

Briefly, in accordance with a preferred embodiment of the present invention, an electrical meter of the D'Arsonval type utilizes a heat absorbing meter movement or a meter movement including a heat absorbing vane attached thereto. In the case of a vane, it is desirably located in a plane parallel to that defining the path taken by the meter pointer when input currents are supplied to the meter. A pair of spaced thermistors are located proximate to the path of the vane and are electrically connected in different legs of an electrical bridge network. The resistance of these elements varies according to their temperature which in turn varies according to the position of the vane which acts as a heat sink. The output of the bridge accordingly provides an electrical signal indicative of the position of the vane relative to these elements. By way of example, the bridge may be adjusted to provide a low output signal below a predetermined meter reading and a high signal of given polarity above this reading, or alternatively, the bridge may be adjusted to change polarity at a predetermined meter reading.

As described hereinafter, the thermistors may be mounted upon a member which is movable relative to the meter movement; the point at which the bridge output changes may then be varied according to the exigencies of the use for which the transducer is employed.

Transducers constructed in the manner described offer the accuracies and sensitivities of D'Arsonval meter movements without the problems introduced by using an interrupted light path as the pointer sensing means. Thermistors operate upon a watt or less of power and at relatively low tempermatures. Moreover, they are rugged devices and do not require periodic replacement.

A more thorough understanding of the invention may be obtained by study of the following detailed description taken in connection with the accompanying drawings in which:

FIG. 1 is a front view of a transducer constructed in accordance with this invention in which a portion of the case has been removed to more clearly expose the cooperating parts;

FIG. 2 is a sectional view taken along line 2—2 of FIG. 1;

FIG. 3 is a schematic circuit diagram of the transducer;

FIGS. 4a, 4b, 4c and 4d illustrate wave forms of different modes of operation for transducers of the invention;

FIG. 5 illustrates an alternative embodiment of this invention having an adjustable alarm point; and FIG. 6 is a sectional view taken along line 6—6 of FIG. 5.

Referring now to FIGS. 1 and 2, the electrical transducer 10 comprises an electrical meter of the D'Arsonval type including a housing 11 within which is fixedly mounted a permanent magnet 12 for generating a radial magnetic field for the meter movement 16, which principally includes coil 13 and pointer 20. Coil 13 pivots about axis 14 by means of axles 15a and 15b mounted in suitable bearings fixed to the meter housing. Resilient spiral springs 17 are located between the housing 11 and axle 15b. Attached to the axle 15b and rotating with the coil is the needle pointer 20 which normally cooperates with a scale 21 to provide a visual readout of the displacement of the meter movement.

In the exemplary embodiment of the present invention, a heat absorbing vane 22 is affixed to the pointer 20 to permit the transfer of heat energy from either thermistor 25 or thermistor 26 as described hereinafter. As shown, the vane may comprise a four-sided figure, two sides of which comprise segments of a circle having its center substantially coincident with axis 14. The vane has a thin cross section lying generally in the plane defined by movement of the pointer 20 as it pivots about axis 14. It will be apparent to those skilled in the art that other configurations for the vane may be employed including numerous polygonal configurations. As shown, the vane is centered with respect to the pointer 20 for minimizing its effect upon the balance of the meter movement. This configuration has been selected for purposes of explanation since it is easily described. Actually, the vane would be counter-balanced with respect to the pivots to eliminate reading errors due to changes in the meter orientation in the gravitational field.

Preferably, the vane 22 is constructed of a material having a high coefficient of thermal conductivity such as aluminum or copper and it may be coated with lamp black for maximum heat absorption. This vane may be attached to the pointer 20 by means of a suitable cement or alternatively the pointer and vane may be constructed as an integral member.

Spaced resistive elements sensitive to temperature are fixed in a plane which is parallel with and closely adjacent the plane defined by the vane part of the meter movement as it rotates. Preferably, these elements are semiconductive devices known in the art as thermistors. These devices make use of the change of resistivity of a semiconductor with change in temperature. The classical thermistor has a large negative temperature coefficient of resistance of the order of a 3 to 4 percent per degree centigrade. For a detailed understanding of these devices, see the article by J. A. Becker et al., entitled "Properties and Uses of Thermistors—Thermally Sensitive Resistors," published in the A.I.E.E. Transactions, volume 65, pp. 711–725 (November 1946).

The mode of mounting these thermistors shown in FIGS. 1 and 2 involves mounting bead thermistors 25, 26, each having a diameter in the order of .01 inch, to respective hermetic seals 27, 28 soldered to a metal plate 29 which is in turn fastened to the meter housing 11. Other modes of fastening the thermistors to the meter will become apparent to those skilled in the art. In addition, an alternative construction providing movement of the thermistors relative to the meter pointer is described hereinafter.

The thermistor beads 25, 26 are positioned so as to be closely spaced from the vane 22 when the pointer is in a position overlying the bead, a representative spacing dimension being .01 inch. As shown in FIG. 1, the shape and position of the vane and the position of the thermistor beads is such that the vane overlies bead 25 in one position and overlies bead 26 in another position. Normally, the position of bead 25 relative to bead 26 is such that the vane is adjacent only one thermistor below a given meter reading and adjacent the other thermistor above that meter reading. A representative alarm reading is some fixed percentage of the total scale reading so that the user knows when the meter has advanced beyond this predetermined alarm point.

An electrical schematic of the transducer of FIGS. 1 and 2 is shown in FIG. 3 and comprises a Wheatstone bridge circuit having the thermistors 25, 26 as respective legs AB and AD thereof. The remaining legs BC and CD of the bridge include resistors 35, 36 which may be equal in resistance value and respective portions of a potentiometer 37 having its end terminals respectively connected to resistors 35, 36 and its movable contact (bridge nodes C) connected to one terminal of the power source 38. The other terminal of the power source is connected to the common junction of thermistors 25, 26 (bridge node A) via a current limiting resistor 39. The input to the transducer ($e_{in}$) is connected to the meter movement to actuate the pointer 20, and the output of the transducer $e_{out}$ is derived from the bridge output measured between bridge nodes B and D.

The operation of the transducer shown in FIGS. 1, 2 and 3 and described above is as follows: with currents supplied the meter movement below a certain predetermined point, the heat absorbing vane 22 remains proximate thermistor bead 25. A greater amount of heat energy is then transferred to vane 22 from this thermistor than is transferred from thermistor 26. This maintains thermistor 25 at a lower temperature than thermistor 26. As a result, the resistance of element 25 is then higher than element 26 (or bridge leg AB is higher in resistance than leg AD) because of the negative temperature coefficient of resistivity of the thermistor elements.

The opposite operating mode is presented when a sufficient current has been applied to the meter coil 13 to cause the vane 22 to move adjacent thermistor 26. The resistance of bridge leg AB is then substantially lower than bridge leg AD. The resultant change in potential between output nodes D and B of the bridge for these respective operating conditions provides an output signal correlatable with the input current supplied the meter 10. The output of the bridge is determined by the well-known relationship $$\frac{AB}{AD} = \frac{BC}{CD} \qquad (1)$$

when the bridge is balanced and there is zero potential difference between nodes B and D. Thus, if the temperature of thermistor 25 is decreased by being proximate vane 22, the resistance of leg AD is increased so that the bridge is no longer in balance. To rebalance the bridge, the resistance of leg CD must be increased relative to leg BD which is conveniently accomplished by displacing the movable contact of potentiometer 37 to the left in FIG. 3. The analogous operation occurs when the temperature of thermistor 26 is decreased below thermistor 25; the movable contact of potentiometer 37 must then be displaced to the right to rebalance the bridge.

The circuitry of FIG. 3 may be employed to give different types of output signals depending upon the particular application in which the transducer is employed. Thus, the most stable alarm point is normally achieved by adjusting the potentiometer 37 (thereby adjusting bridge node C) to obtain a substantially zero output at the alarm point, i.e. when the influence of the vane is shifting to one thermistor from the other. Below this point, the bridge output is a voltage of one polarity and above this point, the bridge output is a voltage of the opposite polarity. The alarm point is thus fixed by a change in polarity of the bridge output.

An alternative operation is provided by adjusting node C to obtain minimum and maximum voltages on opposite sides of the alarm point. These operational modes are further described below with reference to FIG. 4. In order to operate an alarm device requiring considerable power, a moderately sensitive relay may be connected to the output. Any other conventional equipment, such as a power amplifier, may also be connected to the output.

FIG. 4a illustrates an input voltage wave form 45 of steadily increasing magnitude which passes through the predetermined alarm point 46.

FIG. 4b illustrates the output voltage when the bridge potentiometer 37 has been preset to balance the bridge for zero output at the alarm point. Accordingly, the output voltage is at a maximum value of $-V$ below the alarm point and maximum value of approximately $+V$ above the alarm point. If the thermistors are closely matched in resistance and temperature coefficient, the bridge outputs above and below the alarm point will be substantially equal in magnitude and opposite in polarity. The relative output polarities may be reversed by reversing the polarity of bridge power supply 38. A conventional polarized relay of moderate sensitivity may be connected to the output terminals to apply power to an alarm load.

FIG. 4c illustrates the output wave form $e_{out}$ for an alternative setting of bridge potentiometer 37 wherein bridge node C is preset to balance the bridge below the alarm point. The alarm point is then defined by a sharp increase in voltage output to a value of 2V. Again the polarity of this voltage may be reversed by reversing the terminals of power supply 38.

FIG. 4d illustrates the output wave form of $e_{out}$ when the potentiometer 37 has been adjusted to balance the bridge above the alarm point. The movable contact of this potentiometer is then moved to the left in FIG. 3 to maintain the relationship of Equation 1. The bridge power supply polarity has been reversed in this case, so that below the alarm point the bridge output is at a maximum value of $+2V$. Without reversing the power supply, the output below the alarm point would be $-2V$.

The transducer of FIGS. 1–3 may be energized by an alternating current power source. The alarm point may then be denoted by a reduction to zero of the bridge output current followed by a reversal in phase as the meter is supplied input signals in excess of the predetermined alarm point. This operation is analogous to the function illustrated by the waveform of FIG. 4b. Or, by appropriate adjustment of potentiometer 37, the alarm point will be denoted by the presence or absence of an alternating current signal. FIGS. 4c and 4d then represent the R.M.S. value of the alternating current waveform.

The alarm point of the transducer described above is inherently substantially independent of voltage changes of bridge supply 38 and changes in ambient temperature when the bridge is balanced at the alarm point, particularly if the two thermistors are closely matched for resistance and temperature coefficient of resistivity. Thus, if the voltage supplied by source 38 decreases, the currents flowing through both legs decrease, thereby lowering the temperature of both thermistors equally. When their characteristics are evenly matched, their resistances will increase equally thereby changing the ratio $AB/AD$ only slightly. An increase in the output of supply 38 results in an increase of resistance of both legs with the ratio therebetween being only slightly affected. Changes in ambient temperature produce a corresponding effect, a change in ambient temperature causing an inverse change in resistance of both of the legs AB and AD. Although the magnitude of V in the examples may change considerably under these conditions, the position of the vane at which the output changes very rapidly is hardly affected. As a result, the accuracy of the transducer remains high even under periods of fluctuating power supply voltages and ambient temperatures.

The operation of the system of FIG. 3 may be further described by reference to a specific transducer employing the following component values:

| | |
|---|---|
| Thermistors 25, 26 | VECO type 51A22, 100,000 ohms at 25° C. |
| Resistors 35, 36 | 600 ohms. |
| Potentiometer 37 | 10,000 ohms. |
| Power Supply 38 | 108 volts D.C. |
| Resistor 39 | 70,000 ohms. |

It will be understood that these values are by way of example only and not by way of limitation. In operation, this transducer operated the thermistors at about 100° C. when the vane 22 was not adjacent thereto. The bridge voltage drop was about 9 volts and the maximum output of the bridge was about 0.3 volt.

Another embodiment of the invention shown in FIGS. 5 and 6 provides a means for easily changing the alarm point of the transducer. For convenience, those components which may be identical to embodiment described above have been given the same identification numerals. As shown, the plate 60 upon which the space thermistors 25, 26 are mounted may be moved through a predetermined curvilinear distance by means of the arcuate dovetail groove 61 located in the inner front face 62 of housing 63. An adjustment bolt 64 in threaded engagement with movable plate 60, is accessible through the curved slot 65, extending through the front housing face 62.

In operation, the embodiment of FIG. 5 functions in a manner identical to the embodiment described above in which the thermistors were fixedly mounted to the housing. However, the operator may preselect the alarm point by moving bolt 64 to the right in FIG. 5a to increase the magnitude of the alarm point and to the left to decrease the magnitude of the alarm point. The bolt 64 may then be tightened to lock the thermistors in the preset position.

To a degree, the same salutory effect of the instant invention can be obtained by mounting the thermistor on the meter movement and fixedly attaching a heat absorbing member proximate the path of the thermistor bead. The only disadvantage is that it tends to limit the number of thermistors that can be used and requires movable electrical leads that do not interfere with the meter movement.

Although exemplary embodiments of the invention have been disclosed and discussed, it will be understood that other applications of the invention are possible and that the embodiments disclosed may be subjected to various changes, modifications and substitutions without necessarily departing from the spirit of the invention. By way of example, although the embodiments described above have a single alarm point, it will be apparent that plural alarm positions may be provided by increasing the number of thermistors spaced relative to the movable vane. Such plural sensing apparatus may be used, for example, to provide an alarm below a predetermined meter reading and an alarm above a predetermined reading e.g. at 10% full scale and 90% full scale of the meter scale.

What is claimed is

1. In a meter having a pointer movable in response to input signals, the combination of
   a heat absorbing vane attached to said pointer,
   first and second spaced-apart thermistors mounted proximate the plane defined by the path of said vane whereby differential quantities of heat energy emanating from said thermistors will be absorbed by said vane depending upon the pointer position, and
   means connected to said thermistors to provide an output signal proportional to the change in resistance of one of said thermistors relative to the other of said thermistors.

2. A meter in accordance with claim 1 and including means for rotating said thermistors along a curvilinear path having a center substantially coincident with the pivot axis of said pointer.

3. In a meter having a movement responsive to input signals, the combination of
   a heat absorbing meter movement,
   temperature sensitive resistance means mounted proximate the path of said meter movement, and
   means responsive to changes in electrical resistance of said resistance means as it loses heat to said meter movement to produce an output signal proportional to an instant input signal.

4. An alarm meter having a pointer movable in response to input signals comprising, in combination,
   a heat absorbing vane affixed to said pointer, said vane being located generally in the plane described by the path of said pointer,
   resistance means whose value varies with temperature mounted proximate the path described by said heat absorbing vane, and
   means responsive to a preselected change in electrical resistance of said resistance means caused by the proximity of said pointer thereto to produce an alarm signal.

5. An alarm meter having a pointer movable in response to input signals in accordance with claim 4 wherein said responsive means include a normally balanced Wheatstone bridge, and including means operable to shift the physical position of said resistance means along a path proximate the path described by said vane.

No references cited.

NEIL C. READ, *Primary Examiner.*